United States Patent Office"

3,164,587
CYANINE DYES AND TO THE PRODUCTION AND USE THEREOF

Geoffrey Ernest Ficken, Ilford, England, assignor to Ilford Limited, Ilford, England, a company of Great Britain
No Drawing. Filed Nov. 8, 1962, Ser. No. 236,435
Claims priority, application Great Britain, Nov. 17, 1961, 41,316/61
5 Claims. (Cl. 260—240.1)

This invention relates to cyanine dyes and to the production and use thereof.

In accordance with the present invention there are provided cyanine dyes of the general formula:

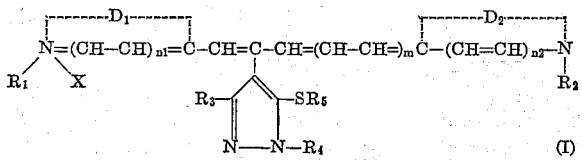

(I)

In the foregoing formula, $R_1$ and $R_2$ are the same or different and are alkyl groups, or hydroxyalkyl groups, preferably containing up to 4 carbon atoms, or aralkyl groups, $R_3$ is hydrogen or an alkyl group, $R_4$ is an aryl group, $R_5$ is an alkyl group, an alkyl group containing a substituent of any of the forms —OR, —NRR, —SO₃R, —OSO₃R, —COOR, —CONH₂ or —CN, where the various R's represent hydrogen or alkyl groups, or is an aralkyl group, $n1$ and $n2$ are each nought or one, $m$ is nought or one, X is an acid radical, and $D_1$ and $D_2$ are each the residue of a five-membered or six-membered heterocyclic nitrogen nucleus.

In the foregoing formula the alkyl groups are preferably methyl, ethyl, propyl or butyl, a suitable hydroxyalkyl group is β-hydroxyethyl, and a suitable aralkyl group is benzyl.

$D_1$ and $D_2$ may each be the residue of any five-membered or six-membered heterocyclic ring system including thiazoles, oxazoles, selenazoles and their polycyclic homologues such as those of the benzene and naphthalene series; pyridine and its polycyclic homologues, such as quinoline and α- and β-naphthoquinolines; indolenines; diazoles (eg. 1:3:4-thiadiazole); thiazolines; diazines (e.g. pyrimidines and quinazolines). The polycyclic compounds of the series may be substituted in the carbocyclic rings with one or more groups such as alkyl, aryl, alkoxy and methylene dioxy groups, or by halogen atoms.

X may be any acid radical, for example halide (chloride bromide, iodide), sulphate, sulphamate, perchlorate or p-toluene sulphonate.

The invention further includes the compounds of Formula I from which the group X and the hydrogen atom of the carboxylic or sulphonic acid group in $R_5$ have been eliminated.

According to a further feature of the invention the compounds of general Formula I are prepared by reacting a compound of general Formula II:

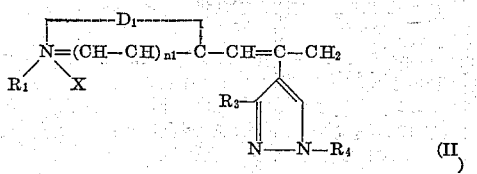

(II)

with a compound of the general Formula III:

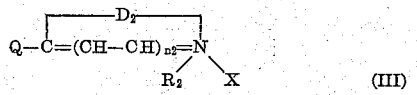

(III)

where Q is a thioether (SR), thioether vinyl (—CH= CH—SR) or acetanilidovinyl group and R is an alkyl group containing up to 6 carbon atoms.

Instead of using a compound of Formula III there may be used a corresponding base together with a stoichiometric quantity of a quaternary salt $R_2X$.

The foregoing condensations are most conveniently effected by heating the reagents together in the presence of a basic condensing agent, e.g. pyridine, piperidine or triethylamine.

The starting materials of general Formula II may be made by several methods, e.g.:

(a) reacting a compound of general Formula IV:

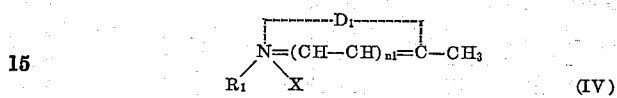

(IV)

with a compound of general Formula V:

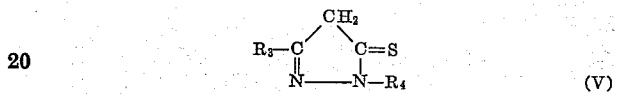

(V)

and an orthoacetate of the Formula VI:

$$CH_3—C(OR)_3$$

(VI)

R being an alkyl group of up to 6 carbon atoms and the other symbols having the meanings assigned to them above.

(b) reacting a compound of the Formula VII:

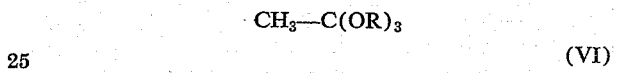

(VII)

where T is a thioether or substituted amino group, with a compound of general Formula V above.

(c) Reacting a compound of the general Formula VIII:

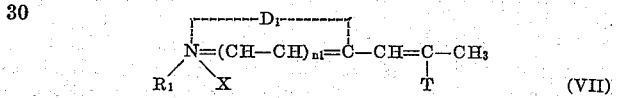

(VIII)

with phosphorus pentasulphide, each of the foregoing procedures (a), (b) and (c) being followed by treatment of the product with a quaternating agent $R_5X$.

The products of Formula I are valuable sensitizers for silver halide photographic emulsions, particularly gelatino silver halide emulsions, and may be used as such in manner known per se for other sensitizing cyanine dyes.

In the examples which follow some of the intermediates are new compounds and their production is set out below.

3-METHYL-2-[2-(3-METHYL - 1 - PHENYL-5-THIO-4-PYRAZOLINYLIDENE) - PROPYLIDENE]-BENZOTHIAZOLINE (a) A mixture of 3-methyl-1-phenylpyrazol-5-thione (6.3 g.), 2,3-dimethylbenzothiazolium toluene-p-sulphonate (11.1 g.), ethyl orthoacetate (9.0 ml.), and pyridine (20 ml.) was refluxed for 10 minutes. The solid which separated was collected and washed with boiling ethanol to leave 3-methyl-2-[2-(3-methyl-1-phenyl-5-thio-4-pyrazolinylidene)-propylidene]-benzothiazoline, which formed purple plates, M. Pt. 223–224° by crystallisation from pyridine.

(b) A mixture of 3-methyl-2-thioacetylmethylenebenzothiazoline (2.2 g.) and methyl toluene-p-sulphonate (1.9 g.) was heated on the steam bath for 30 minutes. The product was refluxed for 15 minutes in ethanol (10 ml.) with 3-methyl-1-phenylpyrazol-5-thione (2.3 g.) and triethylamine (1.6 ml.). The solid which separated was collected and washed thoroughly with boiling ethanol.

The product formed purple plates, M. Pt. 223–224°, from pyridine, and was identical with the product of (a).

By similar methods the following merocyanines were prepared from 3-methyl-1-phenylpyrazol-5-thione.

3-ETHYL-2-[2-(3 - METHYL - 1 - PHENYL-5-THIO-4-PYRAZOLINYLIDENE) - PROPYLIDENE] - BENZOTHIAZOLINE

The compound formed purple needles, M. Pt. 205–206°, by crystallisation from 2-methoxyethanol.

3,4 - DIMETHYL - 2 - [2 - (3 - METHYL - 1 - PHENYL-5 - THIO - 4 - PYRAZOLINYLIDENE) - PROPYLIDENE]-Δ⁴-THIAZOLINE

The compound formed red crystals, M. Pt. 253–254°, after boiling out with methanol.

3,5 - DIMETHYL - 2 - [2 - (3 - METHYL - 1 - PHENYL-5 - THIO - 4 - PYRAZOLINYLIDENE) - PROPYLIDENE]-BENZOSELENAZOLINE

The compound formed deep purple needles, M. Pt. 204–206°, the crystallisation from 2-methoxyethanol.

5-CHLORO - 3 - METHYL-2-[2-(3-METHYL-1-PHENYL-5-THIO - 4 - PYRAZOLINYLIDENE)-PROPYLIDENE]-BENZOTHIAZOLINE

The compound formed purple needles, M. Pt. 280°, by crystallisation from 2-methoxyethanol.

3-METHYL-2-[2-(3-METHYL - 1 - PHENYL-5-THIO-4-PYRAZOLINYLIDENE) - PROPYLIDENE]-BENZOXAZOLINE

A mixture of 3-methyl-2-[2-(3-methyl-5-oxo-1-phenyl-4-pyrazolinylidene)-propylidene]-benzoxazoline (5.0 g.), pyridine (100 ml.), and phosphorus pentasulphide (6.0 g.) was heated on the steam-bath for 16 hours. The solid which separated was filtered off after cooling the mixture, and was washed with a little cold pyridine, and then with ethanol. The compound formed yellow needles, M. Pt. 288° (decomp.) after boiling out with methanol.

3-METHYL-2-[2-(1 - PHENYL - 5 - THIO-4-PYRAZOLINYLIDENE)-PROPYLIDENE] - BENZOTHIAZOLINE

A mixture of 1-phenylpyrazol-5-thione (2.5 g.), 2,3-dimethylbenzothiazolium toluene-p-sulphonate (5.0 g.), pyridine (20 ml.), and ethyl orthoacetate (3.5 ml.) was refluxed for 15 minutes, and the mixture was diluted with ethanol (100 ml.). The solid which separated was collected and washed well with hot ethanol. The compound formed purple needles, M. Pt. 239–240°, by crystallisation from 2-methoxyethanol.

The following examples, in which the temperatures are given in degrees centigrade, will serve to illustrate the invention:

EXAMPLE 1.—BIS - (3 - METHYL - 2 - BENZOTHIAZOLE) β - (3 - METHYL - 5 - METHYLTHIO - 1-PHENYL - 4 - PYRAZOLYL) - TRIMETHINCYANINE IODIDE

A mixture of 3-methyl-2-[2-(3-methyl-1-phenyl-5-thio-4-pyrazolinylidene)-propylidene] - benzothiazoline (0.63 g.), methyl iodide (0.5 ml.), and chloroform (15 ml.) was refluxed for 30 minutes, and the resulting solution was evaporated to dryness. The residual solid was refluxed with 3-methyl-2-methylthiobenzothiazolium toluene-p-sulphone (0.7 g.) in ethanol (10 ml.) containing triethylamine (0.4 ml.). After 30 minutes the solution was treated with concentrated aqueous potassium iodide solution, and the precipitated solid was collected and crystallised from methanol to yield the dye as green plates, M. Pt. 287–288° (decomp.).

The dye extends the sensitivity of a silver iodobromide photographic emulsion to 6500 A. with a maximum at 6350 A.

EXAMPLE 2.—(3-METHYL-2-BENZOTHIAZOLE)(1-METHYL - 2 - QUINOLINE) β-(5-2'-HYDROXYETHYLTHIO - 3 - METHYL-1-PHENYL-4-PYRAZOLYL)-TRIMETHINCYANINE IODIDE

A mixture of 3-methyl-2-[2-(3-methyl-1-phenyl-5-thio-4-pyrazolinylidene)-propylidene] - benzothiazoline (0.95 g.), 2-bromoethanol (0.25 ml.), and chloroform (25 ml.) was refluxed for 15 hours, and the resulting solution was evaporated to dryness. The solid product was refluxed for 10 minutes in ethanol (10 ml.) with 1-methyl-2-methylthioquinolinium toluene-p-sulphonate (1.05 g.) and triethylamine (0.5 ml.). Addition of aqueous potassium iodide solution caused the separation of a tar, which was washed by decantation with water, and was then extracted with boiling benzene, which caused it to harden. Recrystallisation of the solid from ethanol gave the dye as green crystals, M. Pt. 160–163° (decomp.).

EXAMPLE 3.—(3-METHYL-2-BENZOTHIAZOLE)(5,6 - DIMETHOXY - 3 - METHYL - 2 - BENZOTHIAZOLE)β - (5-2'-ETHOXYETHYLTHIO-3-METHYL-1-PHENYL - 4 - PYRAZOLYL)-TRIMETHINCYANINE IODINE

A mixture of 3-methyl-2-[2-(3-methyl - 1 - phenyl-5 - thio-4-pyrazolinylidene)-propylidene] benzothiazoline (0.63 g.), 2-ethoxyethyl bromide (0.3 g.) and 2-methoxyethanol (15 ml.) was refluxed for 45 minutes, and the solvent was evaporated under reduced pressure. The resulting product was refluxed for 45 minutes in ethanol (15 ml.) with 5,6-dimethoxy-3-methyl-2-methylthiobenzothiazolium toluene-p-sulphonate (0.8 g.) and triethylamine (0.3 ml.). Addition of aqueous potassium iodide solution caused the separation of a solid, which was collected and crystallised from ethanol, to yield the dye as green needles, M. Pt. 212–215°.

The dye extends the sensitivity of a silver iodobromide photographic emulsion to 6750 A. with a maximum at 6500 A.

The dyes of Examples 4 to 19 were prepared by methods similar to those described in Examples 1 to 3, the results being collected in Tables 1 and 2. In each case 3-methyl-2-[2-(3-methyl-1-phenyl-5-thio - 4 - pyrazolinylidene)-propylidene] - benzothiazoline was reacted with one of the following quaternising agents:

Methyl iodide
2-bromoethanol
3-bromopropionitrile
2-iodoacetamide
3-iodopropionamide
Methyl 3-iodopropionate
1,2-dihydroxy-3-iodopropane
2-iodoethyl acetate
2-ethoxyethyl bromide $R_6$=—$CH_3$
—$CH_2.CH_2OH$
—$CH_2.CH_2.CN$
—$CH_2.CONH_2$
—$CH_2.CH_2.CONH_2$
—$CH_2.CH_2.CO.OCH_3$
—$CH_2.CH(OH).CH_2OH$
—$CH_2.CH_2.O.CO.CH_3$
—$CH_2.CH_2.OC_2H_5$ Reaction of the quaternary salts similarly with 5,6-di-2-methylthiobenzothiazolium toluene-p-sulphonate, or the corresponding iodide, in ethanol containing triethylamine, gave the dyes of Table 1, which all possess the structure of general formula:

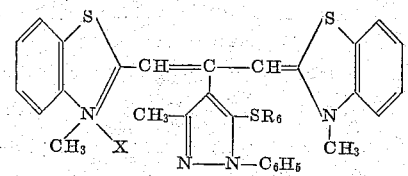

Reaction of the quaternary salts similarly with 5,6-dimethoxy-3-methyl-2-methylthiobenzothiazolium toluene-p-sulphonate gave the dyes of Table 2, all of which possess the structure of general formula:

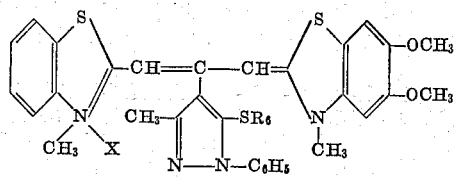

Table 1

| Example | R₆ | Anion | M. pt., °C. | Solvent for crystallisation | Sensitising extent | A. max. |
|---|---|---|---|---|---|---|
| 4 | —CH₂.CH₂OH | Br | 272–273 | Methanol | 6,600 | 6,350 |
| 5 | —CH₂.CH₂.CN | ClO₄ | 163–165 | Ethanol | 6,450 | 6,300 |
| 6 | —CH₂.CONH₂ | I | 274–275 | 2 methoxyethanol | 6,550 | 6,350 |
| 7 | —CH₂.CH₂.CONH₂ | I | 246–247 | Ethanol | 6,600 | 6,350 |
| 8 | —CH₂.CH₂.CO.OCH₃ | I | 236–237 | Ethanol | 6,500 | 6,400 |
| 9 | —CH₂.CH(OH).CH₂OH | I | 247–248 | Methanol | 6,750 | 6,350 |
| 10 | —CH₂.CH₂.O.CO.CH₃ | I | 181–184 | Methanol | 6,500 | 6,350 |
| 11 | —CH₂.CH₂.OC₂H₅ | I | 248–250 | Methanol | 6,500 | 6,350 |

Table 2

| Example | R₆ | Anion | M. pt., °C. | Solvent for crystallisation | Sensitising extent | A. max. |
|---|---|---|---|---|---|---|
| 12 | —CH₃ | I | 269 | Methanol | 6,700 | 6,350 |
| 13 | —CH₂.CH₂OH | Br | 266–267 | do | 6,900 | 6,650 |
| 14 | —CH₂.CH₂.CN | ClO₄ | 183–184 | Ethanol | 6,700 | 6,500 |
| 15 | —CH₂.COHN₂ | I | 275–276 | 2-methoxyethanol | 6,850 | 6,600 |
| 16 | —CH₂.CH₂.CONH₂ | I | 193–195 | Methanol | 6,750 | 6,500 |
| 17 | —CH₂.CH₂.CO.OCH₃ | I | 241–242 | Ethanol | 6,700 | 6,400 |
| 18 | —CH₂.CH(OH).CH₂OH | ClO₄ | 203–205 | Methanol | 6,700 | 6,150 |
| 19 | —CH₂.CH₂.O.CO.CH₃ | ClO₄ | 158–162 | Ethanol | 6,600 | 6,200 |

EXAMPLE 20.—(3 - METHYL-2-BENZOTHIAZOLE) (5,6 - DIMETHOXY - 3 - METHYL-2-BENZOTHIAZOLE)β - (5 - 2' - DIETHYLAMINOETHYLTHIO- 3 - METHYL - 1 - PHENYL - 4 - PYRAZOLYL)- TRIMETHINCYANINE IODIDE

A mixture of 3-methyl-2-[2-(3-methyl-1-phenyl-5-thio-4 - pyrazolinylidene)-propylidene]-benzothiazoline (0.63 g.), 2-diethylaminoethyl bromide hydrobromide (0.5 g.), chloroform (20 ml.) and triethylamine (0.28 ml.) was refluxed for 30 minutes. The residue remaining after evaporation of the solvent was refluxed for 40 minutes in ethanol (15 ml.) with 5,6-dimethoxy-3-methyl-2-methylthiobenzothiazolium toluene-p-sulphonate (0.8 g.) and triethylamine (1.0 ml.). Addition of aqueous potassium iodide solution caused the separation of a solid, which was crystallised from ethanol to yield the dye as green plates, M. Pt. 242–243°.

The dye extends the sensitivity of a silver iodobromide photographic emulsion to 6650 A. with a maximum at 6400 A.

EXAMPLE 21. — ANHYDRO-(3-METHYL-2-BENZOTHIAZOLE)(5,6 - DIMETHOXY - 3 - METHYL - 2- BENZOTHIAZOLE)β - (3 - METHYL-1-PHENYL-5- 2'- SULPHOETHYLTHIO - 4 - PYRAZOLYL) - TRIMETHINCYANINE HYDROXIDE.

A mixture of 3-methyl-2-[2-(3-methyl-1-phenyl-5-thio-4 - pyrazolinylidene) - propylidene]benzothiazoline (0.63 g.), sodium 2-bromoethane-sulphonate (0.4 g.) and 2-methoxyethanol (15 ml.) was refluxed for 3½ hours, and the solvent was evaporated under reduced pressure. The solid product was refluxed for 40 minutes in ethanol (15 ml.) with 5,6-dimethoxy-3-methyl-2-methylthiobenzothiazolium toluene-p- sulphonate (0.8 g.) and triethylamine (1.0 ml.). The solid which separated was collected and boiled out with methanol to yield the dye as green plates, M. Pt. 365°.

The dye extends the sensitivity of a silver iodobromide photographic emulsion to 6700 A. with a maximum at 6200 A.

EXAMPLE 22. — BIS - (3 - METHYL-2-BENZOTHIAZOLE)β-(3 - METHYL - 1 - PHENYL-5,2'-SULPHOETHYLTHIO - 4 - PYRAZOLYL) - TRIMETHINCYANINE IODIDE.

The method of Example 21 was used, but with 3-methyl-2-methylthiobenzothiazolium toluene - p - sulphonate (0.7 g.) in place of the dimethoxy-quaternary salt. The product was precipitated by addition of aqueous potassium iodide, and was crystallized from methanol, forming green needles, M. Pt. 295–298° (decomp.). It consisted of a mixture of the dye named in the title with that formed by loss of hydrogen iodide, viz. anhydro-bis-(3-methyl-2-benzothiazole)β - (3-methyl-1-phenyl-5-2'-sulphoethylthio-4-pyrazolyl)-trimethincyanine hydroxide.

The mixture extends the sensitivity of a silver iodobromide photographic emulsion to 6600 A. with a maximum at 6350 A.

EXAMPLE 23. — (3 - METHYL-2-BENZOTHIAZOLE) (5,6 - DIMETHOXY - 3 - METHYL-2-BENZOTHIAZOLE) β-(5-CARBOXYMETHYLTHIO-3-METHYL- 1 - PHENYL - 4 - PYRAZOLYL) - TRIMETHINCYANINE IODIDE.

A mixture of 3-methyl-2-[2-(3-methyl-1-phenyl-5-thio-4-pyrazolinylidene)-propylidene]-benzothiazoline (1.9 g.) and bromoacetic acid (0.8 g.) was refluxed in chloroform (50 ml.) for 1 hour. Evaporation of the solution to dryness gave a red tar, which was refluxed for 1½ hours in ethanol (20 ml.) with 5,6 - dimethoxy - 3 - methyl - 2- methylthiobenzothiazolium toluene-p-sulphonate (2.6 g.) and anhydrous sodium acetate (0.6 g.). Addition of aqueous potassium iodide solution caused the separation of a solid, which was washed successively with cold water, hot benzene, and ether. This crude product (1.0 g.) was crystallised from methanol containing hydriodic acid (S.G. 1.7, 0.4 ml.) to yield the dye as green crystals, M.P. 234–235° (decomp.). (Found: 50.7; H, 4.3; I, 15.85; S, 12.4. $C_{33}H_{31}IN_4O_4S_3$. $CH_4O$ requires C, 50.9; H, 4.4; I, 15.8; S, 12.0%.)

The dye extends the sensitivity of a silver iodobromide photographic emulsion to 6450 A. with a maximum at 6750 A.

EXAMPLE 24. — ANHYDRO-(3-METHYL-2-BENZOTHIAZOLE)(5,6 - DIMETHOXY - 3 - METHYL - 2- BENZOTHIAZOLE)β - (5 - CARBOXYMETHYLTHIO - 3 - METHYL - 1-PHENYL-4-PYRAZOLYL)- TRIMETHINCYANINE HYDROXIDE.

A solution of the crude product (0.9 g.) from Example 23 in a mixture of methanol (60 ml.) and chloroform (20 ml.) was run through an ion-exchange column ("Deacidite E") and was washed through with the same solvent mixture. The eluates were evaporated to small volume and diluted with ether. The solid which separated was collected and crystallised from methanol to yield the dye as bronze-coloured plates, M. Pt. 214–215° (decomp.). (Found: C, 60.2; H, 5.6; S, 14.7.

$$C_{33}H_{30}N_4O_4S_5 \cdot H_2O$$

requires C, 60.0; H, 4.9; S, 14.6%.)

The dye extends the sensitivity of a silver iodobromide photographic emulsion to 6450 A. with a maximum at 6750 A.

EXAMPLE 25.—BIS - (3 - METHYL-2-BENZOTHIAZOLE) β-(5-2'-CARBOXYETHYLTHIO-3-METHYL-1 - PHENYL - 4 - PYRAZOLYL) - TRIMETHINCYANINE IODIDE.

A mixture of 3-methyl-2-[2-(3-methyl-1-phenyl-5-thio-4 - pyrazolinylidene) - propylidene]-benzothiazoline (0.63 g.), 3-iodopropionic acid (0.4 g.) and chloroform (15 ml.) was refluxed for 35 minutes, and the solvent evaporated. The product and 3-methyl-2-methylthiobenzothiazolium toluene-p-sulphonate (0.7 g.) were refluxed for 40 minutes in ethanol (15 ml.) containing triethylamine (1.0 ml.). Addition of aqueous potassium iodide solution caused the separation of the product, which formed purple crystals, M. Pt. 182–184°, by crystallisation from ethanol. It consisted of a mixture of the dye named in the title with that formed by loss of hydrogen iodide, viz. anhydro-bis-(3-methyl-2-benzothiazole)β - (5-2'-carboxyethylthio - 3-methyl-1-phenyl-4-pyrazolyl) - trimethyincyanine hydroxide.

The mixture extends the sensitivity of a silver iodobromide photographic emulsion to 6650 A. with a maximum at 6400 A.

EXAMPLE 26.—(3-METHYL-2-BENZOTHIAZOLE) (5,6 - DIMETHOXY - 3 - METHYL-2-BENZOTHIAZOLE) β-(5-2'-CARBOXYETHYLTHIO-3-METHYL-1 - PHENYL - 4 - PYRAZOLYL) - TRIMETHINCYANINE PERCHLORATE.

The method of Example 25 was employed, but using 5,6-dimethoxy-3-methyl-2-methylthiobenzothiazolium toluene-p-sulphonate (0.8 g.). The product was precipitated by the addition of aqueous sodium perchlorate, and was obtained as purple crystals, M. Pt. 194–198° (decomp.), by crystallisation from methanol. It consisted of a mixture of the dye named in the title with that formed by loss of perchloric acid, viz. anhydro-(3-methyl-2-benzothiazole)(5,6 - dimethoxy-3-methyl-2-benzothiazole)β-(5-2' - carboxyethylthio-3-methyl-1-phenyl-4-pyrazolyl)-trimethincyanine hydroxide.

The mixture extends the sensitivity of a silver iodobromide photographic emulsion to 6800 A. with a maximum at 6500 A.

EXAMPLE 27.—(3-METHYL-2-BENZOTHIAZOLE)-(5,6 - DIMETHYL - 3 - METHYL - 2 - BENZOTHIAZOLE) β-(3-METHYL-1-PHENYL-5-2'-SULPHATOETHYLTHIO-4-PYRAZOLYL)-TRIMETHINCYANINE IODIDE

A mixture of 3-methyl-2-[2-(3-methyl-1-phenyl-5-thio-4-pyrazolinylidene) - propylidene] - benzothiazoline (0.6 g.), triethylammonium 2-bromoethylsulphate (0.6 g.) and 2-methoxyethanol (10 ml.) was refluxed for 2 hours, and the solvent was evaporated under reduced pressure. The residual product was refluxed in ethanol (20 ml.) for 45 minutes with 5,6-dimethoxy-3-methyl-2-methylthiobenzothiazolium toluene-p-sulphonate (0.8 g.) and triethylamine (0.5 ml.). The solid obtained by pouring the resulting solution into aqeuous potassium iodide solution was collected and crystallised from ethanol, to yield the product as blue crystals, M. Pt. 186–190°. It consisted of a mixture of the dye named in the title with that formed by loss of hydrogen iodide, viz. anhydro-(3-methyl-2-benzothiazole) (5,6-dimethoxy-3-methyl-2-benzothiazole) β-(3 - methyl-1-phenyl-5-2'-sulphatoethylthio-4-pyrazolyl)-trimethincyanine hydroxide.

The mixture extends the sensitivity of a silver iodobromide photographic emulsion to 6550 A. with a maximum at 6750 A.

EXAMPLE 28.—BIS - (3 - METHYL-2-BENZOTHIAZOLE) β - (5-2'-HYDROXYETHYLTHIO-3-METHYL-1-PHENYL-4-PYRAZOLYL) - PENTAMETHINCYANINE BROMIDE

A mixture of 3-methyl-2-[2-3-1-phenyl-5-thio-4-pyrazolinylidene) - propylidene]-benzothiazoline (1.9 g.), 2-bromoethanol (0.4 ml.) and chloroform (50 ml.) was refluxed for 16 hours. The product obtained by evaporation of the solution was refluxed for 15 minutes in ethanol (10 ml.) with 2-ω-ethylthiovinyl-3-methylbenzothiazolium toluene-p-sulphonate (2.0 g.) and triethylamine (0.7 ml.). The solid which separated on cooling the solution was collected and crystallised from methanol, to give the dye as green plates, M. Pt. 207–208° (decomp.).

The dye imparts a new band of sensitivity to a silver iodobromide photographic emulsion from 6700 A. with a maximum at 7300 A.

EXAMPLE 29.—BIS - (3 - METHYL-2-BENZOTHIAZOLE) β - (5 - 2' - CARBAMOYLETHYLTHIO-3-METHYL - 1 - PHENYL-4-PYRAZOLYL)-PENTAMETHINCYANINE IODIDE

Using the method of Example 28, but with 3-iodopropionamide in place of 2-bromoethanol, the dye was obtained as blue crystals, M. Pt. 178–180°, by crystallisation from ethanol.

EXAMPLE 30.—(3 - METHYL-2-BENZOTHIAZOLE)-(1,3,3 - TRIMETHYL-2-INDOLIUM) β - (5 - 2' - HYDROXY-ETHYL-THIO-3-METHYL - 1 - PHENYL-4 - PYRAZOLYL) - PENTAMETHINCYANINE IODIDE 3-methyl-2-[2-(3-methyl-1-phenyl-5-thio-4-pyrazolinylidene)-propylidene]-benzothiazoline (0.95 g.) and 2-bromoethanol (0.2 ml.) were reacted together as in Example 28. The product so obtained was refluxed for 20 minutes with 2-ω-acetanilidovinyl-1,3,3-trimethylindolium iodide (1.2 g.) in pyridine (10 ml.) containing triethylamine (0.4 ml.). Treatment of the resulting solution with a concentrated aqueous solution of potassium iodide caused the separation of a solid, which was collected and crystallised from ethanol to yield the dye as green crystals, M. Pt. 197–199°.

EXAMPLE 31.—(ETHYL - 2 - BENZOTHIAZOLE) (3-ETHYL-5,6-DIMETHOXY-2-BENZOTHIAZOLE) β-(5-2' - HYDROXYETHYLTHIO - 3 - METHYL - 1 - PHENYL - 4 - PYRAZOLYL) - TRIMETHINCYANINE IODIDE

A mixture of 3-ethyl-2-[2-(3-methyl-1-phenyl-5-thio-4-pyrazolinylidene)-propylidene]benzothiazoline (0.65 g.), 2-bromethanol (0.2 ml.) and chloroform (20 ml.) was refluxed for 30 minutes, and solevnt evaporated off. The product was refluxed for 30 minutes with 3-ethyl-2-ethylthio-5,-dimethoxybenzothiazolium toluene-p-sulphonate (0.9 g.) in ethanol (20 ml.) containing triethylamine (0.5 ml.). Addition of aqueous potassium iodide solution caused the separation of a solid which was collected and crystallised from methanol to yield the dye as purple crystals, M. Pt. 280–281° (decomp.).

The dye extends the sensitivity of a silver iodobromide photographic emulsion to 6700 A. with a maximum at 6400 A.

EXAMPLE 32.—(3,5-DIMETHYL-2-BENZOSELENAZOLE) (5,6 - DIMETHOXY-3-METHYL-2-BENZOTHIAZOLE) β - (5 - 2' - HYDROXYETHYLTHIO-3-METHYL - 1 - PHENYL - 4 - PYRAZOLYL)-TRIMETHINCYANINE IODIDE 3,5 - dimethyl-2-[2-(3-methyl-1-phenyl-5-thio-4-pyrazolinylidene)-propylidene]-benzoselenazoline (0.65 g.)

was refluxed in chloroform (25 ml.) with 2-bromoethanol (0.3 ml.) for 3½ hours. The product obtained by evaporation of the solvent was refluxed for 1 hour in ethanol (10 ml.) with 5,6-dimethoxy-3-methyl-2-methylthiobenzothiazolium toluene-p-sulphonate (0.7 g.) and triethylamine (0.3 ml.). Addition of aqueous potassium iodide solution caused the separation of a tar, which solidified when stirred with ester. The solid was collected and crystallised from ethanol, yielding the dye as green crystals, M. Pt. 251–252°.

The dye extends the sensitivity of a silver iodobromide photographic emulsion to 6900 A. with a maximum at 6650 A.

EXAMPLE 33.—(3,4-DIMETHYL-2-THIAZOLE) (5,6-DIMETHOXY-3-METHYL - 2 - BENZOTHIAZOLE) β-(5-2'-HYDROXYETHYLTHIO - 3 - METHYL - 1 - PHENYL - 4 - PYRAZOLYL)-TRIMETHINCYANINE IODIDE

The method of Example 32 was used, but starting with 3,4-dimethyl-2-[2-(3-methyl-1-phenyl-5-thio - 4 - pyrazolinylidene)-propylydene]-Δ⁴-thiazoline. The dye was obtained as deep green crystals, M. Pt. 265–266° (decomp.) by crystallisation from ethanol.

The dye extends the sensitivity of a silver iodobromide photographic emulsion to 6450 A. with a maximum at 6300 A.

EXAMPLE 34.—BIS - (5 - CHLORO - 3 - METHYL-2-BENZOTHIAZOLE) β-(5-2'-CARBAMOYLETHYL-THIO-3-METHYL-1 - PHENYL - 4 - PYRAZOLYL)-TRIMETHINCYANINE TOLUENE - P - SULPHONATE

A mixture of 5-chloro-3-methyl-2-[2 - (3 - methyl-1-phenyl-5-thio-4-pyrazolinylidene) - propylidene]-benzothiazole (0.72 g.), 3-iodopropionamide (0.4 g.) and chloroform (20 ml.) was refluxed for 2 hours. The product obtained by evaporation of the solution was refluxed for 20 minutes in ethanol (10 ml.) with 5-chloro-2-methylthiobenzothiazolium toluene-p-sulphonate (0.85 g.) and triethylamine (0.3 ml.). The solid which separated was collected and crystallised from methanol, yielding the dye as purple needles with a silvery reflex, M. Pt. 253–254°.

The dye extends the sensitivity of a silver iodobromide photographic emulsion to 6450 A. with a maximum at 6350 A.

EXAMPLE 35.—BIS-(3-METHYL-2-BENZOXAZOLE) β-(3-METHYL - 5 - METHYLTHIO - 1 - PHENYL-4-PYRAZOLYL)-TRIMETHINCYANINE IODIDE

A mixture of 3-methyl-2-[2-(3-methyl-1-phenyl-5-thio-4-pyrazolinylidene)-propylidene]-benzoxazoline (1.2 g.), 2-methyl-thiobenzoxazole (1.65 g.) and methyl toluene-p-sulphonate (3.8 g.) was fused together at 140° for 2½ hours. The resulting melt was dissolved in pyridine (10 ml.) and the solution refluxed or 45 minutes. Addition of aqueous potassium iodide solution caused the separation of a solid, which was collected and crystallised from ethanol, yielding the dye as red needles, M. Pt. 277–279° (decomp.).

The dye extends the sensitivity of a silver iodobromide photographic emulsion to 5850 A. with a maximum at 5700 A.

EXAMPLE 36.—(3 - METHYL-2-BENZOTHIAZOLE) (5,6 - DIMETHOXY - 3 - METHYL-2-BENZOTHIAZOLE) β-5-2'-HYDROXYETHYLTHIO-1-PHENYL-4 - PYRAZOLYL) - TRIMETHINCYANINE BROMIDE

A mixture of 3-methyl-2-[2-(1-phenyl-5-thio-4-pyrazolinylidene)-propylidene]-benzothiazoline (0.6 g.), 2-bromoethanol (0.2 ml.) and chloroform (25 ml.) was refluxed for 15 hours, and the solvent was evaporated. The residue so obtained was refluxed for 45 minutes in ethanol (15 ml.) with 5,6-dimethoxy-3-methyl-2-methyl-thiobenzothiazolium toluene-p-sulphonate (0.8 g.) and triethylamine (0.3 ml.). The solid which separated was collected, was washed with cold ethanol and crystallised from 2-methoxyethanol. The dye formed deep green crystals, M. Pt. 253–254° by crystallisation from 2-methoxyethanol.

The dye extends the sensitivity of a silver iodobromide photographic emulsion to 6800 A. with a maximum at 6700 A.

EXAMPLE 37.—(3 - METHYL-2-BENZOTHIAZOLE) (5,6 - DIMETHOXY - 3 - METHYL-2-BENZOTHIAZOLE) β - (5-2' - CARBAMOYLETHYLTHIO - 1 - PHENYL-4-PYRAZOLYL) - TRIMETHINCYANINE IODIDE

The method of Example 36 was used, with 3-iodopropionamide (0.4 g.) in place of the bromoethanol. The dye was obtained as blue-green crystals, M. Pt. 267–268°, after boiling out with 2-methoxyethanol.

The dye extends the sensitivity of a silver iodobromide photographic emulsion to 6650 A. with a maximum at 6250 A.

What I claim is:
1. Bis-(3-methyl - 2 - benzothiazole) β-(3-methyl-1-phenyl-5-2'-sulphoethylthio-4-pyrazolyl)-trimethincyanine iodide.
2. Bis- 3-methyl - 2 - benzothiazole) β-(5-2'-carboxy-ethylthio-3-methyl - 1 - phenyl - 4 - pyrazolyl)-trimethincyanine iodide.
3. A cyanine dye of the formula

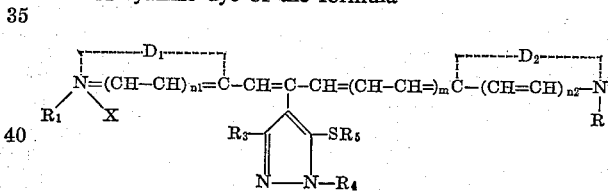

wherein $R_1$ and $R_2$ are each selected from the class consisting of lower alkyl, hydroxy-alkyl where the alkyl moiety contains 1 to 6 carbon atoms and aralkyl where the alkyl moiety contains 1 to 6 carbon atoms, $R_3$ is selected from the class consisting of hydrogen and lower alkyl, $R_4$ is selected from the class consisting of phenyl and naphthyl, $R_5$ is substituted alkyl wherein the substitution is selected only from the group consisting of —OR, —NRR, —SO₃R, —OSO₃R, —COOR, —CONH₂ and —CN wherein R is selected from the group consisting of hydrogen and alkyl containing 1 to 6 carbon atoms, $m$, $n_1$ and $n_2$ are each selected from nought and one, X is an acid radical and $D_1$ and $D_2$ each represent the atoms necessary to complete a heterocyclic nucleus selected from the group consisting of a thiazole nucleus, benzothiazole nucleus, naphthothiazole nucleus, benzoselenazole nucleus, benzoxazole nucleus, naphthoxazole nucleus, pyridine nucleus, quinoline nucleus, γ-naphthoquinoline nucleus, β-naphthoquinoline nucleus, indolenine nucleus, diazole nucleus, thiazoline nucleus and diazine nucleus and corresponding anhydro dyes of the said formula in which the X radical and a hydrogen atom of an acid group contained in $R_5$ are eliminated.

4.

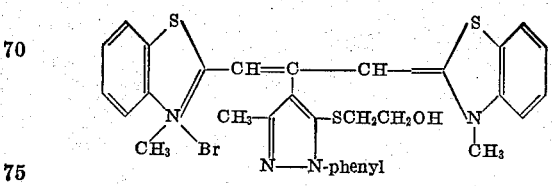

5. 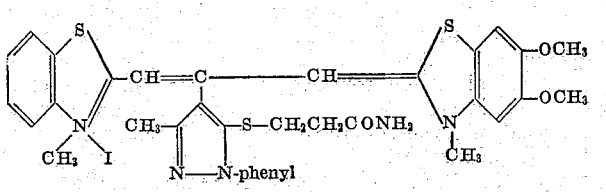
References Cited by the Examiner
UNITED STATES PATENTS
| | | | |
|---|---|---|---|
| 2,304,981 | 12/42 | Wilmanns | 96—106 |
| 2,879,014 | 1/59 | Brooker et al. | 96—106 |
| 2,895,955 | 7/59 | Haseltine et al. | 260—240.5 |
| 2,984,664 | 5/61 | Fry et al. | 260—240.5 |
IRVING MARCUS, *Primary Examiner.*
N. G. TORCHIN, JOHN D. RANDOLPH, WALTER A. MODANCE, *Examiners.*